United States Patent [19]

Trenbeath et al.

[11] 4,374,107

[45] Feb. 15, 1983

[54] METHOD FOR DRYING ISOCYANIC ACID

[75] Inventors: Steven L. Trenbeath, Fairfield; Robert W. Novak, Stamford; Allan M. Feldman, Norwalk, all of Conn.

[73] Assignee: American Cyanamid Company, Stamford, Conn.

[21] Appl. No.: 304,758

[22] Filed: Sep. 23, 1981

[51] Int. Cl.$^3$ ............................ C01C 3/00; C01C 3/14
[52] U.S. Cl. ..................................... 423/265; 423/365
[58] Field of Search ................................ 423/265, 365

[56] References Cited

FOREIGN PATENT DOCUMENTS 558780  6/1958  Canada ............................. 423/365
6516913 6/1967  Netherlands ...................... 423/365

*Primary Examiner*—O. R. Vertiz
*Assistant Examiner*—Wayne A. Langel
*Attorney, Agent, or Firm*—Steven J. Hultquist

[57] ABSTRACT

Removing water from wet isocyanic acid in organic solution of said isocyanic acid by addition hereto of a hydrogen halide or a compound which forms hydrogen halide in said solution in amount sufficient to provide a molar excess of hydrogen halide in said solution relative to the water, and ammonia if any, present in said solution.

12 Claims, No Drawings

METHOD FOR DRYING ISOCYANIC ACID

This invention relates to manufacture of isocyanic acid, HNCO, and in particular provides a process for drying wet isocyanic acid.

In the manufacture of isocyanic acid, for example, by catalytic oxidation of hydrogen cyanide, water is formed as a by-product. Isocyanic acid is useful as a reagent in the formation of many compounds, particularly the isocyanates, because of the ability of isocyanic acid to react directly with many compounds such as olefins, halides and the like to introduce the isocyanate moiety into such compounds. The presence of water is, however, detrimental to such reactions, and water is reactive with the desired isocyanate products. It is, therefore, important that the isocyanic acid be anhydrous.

It has heretofore been proposed to dry isocyanic acid by the use of desiccants, such as $P_2O_5$, (see East German Pat. No. 116,551, issued Dec. 5, 1975). The use of other drying agents and of vacuum distillation have also been suggested. Generally room temperature and higher temperatures have been avoided because of the relatively high vapor pressure of isocyanic acid and because significant losses of isocyanic acid occur at such temperatures. Also, drying has generally been in solution with an organic solvent for the isocyanic acid.

Heretofore, in our laboratories the preferred technique for drying isocyanic acid has been in organic solvent solutions over a two to three day period at dry-ice temperatures utilizing 10 to 15 weight percent of a molecular sieve that was activated in a muffle furnace.

It is accordingly an important object of this invention to provide a process for drying wet isocyanic acid at room temperatures in a matter of hours with no appreciable loss of isocyanic acid. This and other objects of the invention are generally obtained by forming a solution of isocyanic acid containing water in an organic solvent therefor and then adding to such solution a drying agent which is either a hydrogen halide or a compound which will form a hydrogen halide in the solution. The drying agent is added in an amount sufficient to provide hydrogen halide in molar excess of the water present in the solution, such that the corresponding ammonium halide is formed on a mole per mole basis to remove the water content of the isocyanic acid. Ammonia present is also removed.

Drying is carried out in a solvent for isocyanic acid which is preferably an aromatic solvent or a halogenated hydrocarbon, such as benzene, toluene, chlorobenzene and the like. Hydrocarbons, such as heptane, and ethers, such as tetrahydrofuran can also be utilized. Generally the particular solvent is preferably selected to be compatible in subsequent reactions in which the isocyanic acid is to be utilized. Typically from about 5 to about 30 weight percent isocyanic acid is dissolved in the solvent.

It is postulated that hydrogen halide either adds to isocyanic acid to form carbamoyl halide or hydrogen halide accelerates the addition of water to isocyanic acid to form ammonium halide. In the former case, the carbamoyl halide then reacts with the water present forming hydrogen halide, carbon dioxide and ammonia, or carbamic acid which decomposes to form carbon dioxide and ammonia. The ammonia formed then reacts with hydrogen halide to form insoluble ammonium halide. Either process results in the removal of the water as insoluble ammonium halide.

Obviously more than a stoichiometric amount of hydrogen halide, based on the molar amount of water and ammonia present in the isocyanic acid, must be employed. Generally, the preferred drying agent is hydrogen chloride although both hydrogen bromide and hydrogen iodide have been used. Hydrogen chloride can be introduced either as gas or in solution.

Obviously, other agents which release hydrogen halides in situ in the isocyanic acid solution can be employed. Such compounds include carbamoyl halides, phosphorus halides, thionyl halides and the like.

While the removal of water utilizing such drying agents is relatively slow at low temperature, such as 0° C. and below, water removal is rapid, in a matter of hours at room temperatures. Preferably drying of isocyanic acid in accordance with this invention is carried out at temperatures on the order of 10° to 25° C. or higher.

In the case of labile halide compounds, such as methane sulfonyl chloride and thionyl chloride, two mechanisms again can be postulated by which drying occurs. In either event, all hydrolytically labile compounds that form insoluble ammonium salts are capable of drying isocyanic acid in the same manner that hydrogen halide itself directly operates.

In order to explain fully the practical application of this invention a series of experiments have been carried out and the results indicated in tabular form in the accompanying Table I which shows six examples. Example I illustrates drying in the absence of any drying agent. Examples II and III are comparative utilizing hydrogen chloride as the drying agent at 0° C. and 20° C. Example IV is of drying utilizing thionyl chloride at 0° C. Lastly Examples V and VI are comparative examples utilizing methane sulfonyl chloride, again comparing reaction at a low temperature 0° C., with reaction at a room temperature, 23° C.

In each of the examples a wet isocyanic acid in toluene solution was placed in a septum covered serum bottle. In each case where a drying agent was employed the halide compound was subsequently added and the experiment was run at the indicated temperature. Samples were removed for water and isocyanic acid analysis periodically. The initial amount of water and the amounts of water determined on subsequent analysis are indicated in parts per million based on the total weight of solution. Similarly, the initial ammonia content is indicated in parts per million based on the total weight of solution. Isocyanic acid is indicated in weight percent based on the total weight of solution, and the amount of drying agent is indicated in mole percent based upon the total moles of water and ammonia initially present.

TABLE I

| Example No. | Drying Agent Compound | Drying Agent Mole % | Conditions Time, Hours | Conditions Temp., °C. | Water PPM | NH3 PPM | Isocyanic Acid Wt. % |
|---|---|---|---|---|---|---|---|
| I | None | — | 0 | | 1487 | 17.5 | 16.5 |

TABLE I-continued

| Example No. | Drying Agent Compound | Mole % | Time, Hours | Temp., °C. | Water PPM | NH$_3$ PPM | Isocyanic Acid Wt. % |
|---|---|---|---|---|---|---|---|
|  |  |  | 21 | 0 | 1326 |  | 15.1 |
|  |  |  | 70 | 0 | 404 |  | 14.9 |
| II | HCl | 117 | 0 |  | 1210 | 14.8 | 13.3 |
|  |  |  | 5.5 | 0 | 528 |  | 13.3 |
|  |  |  | 23 | 0 | 104 |  | 12.9 |
| III | HCl | 117 | 6 | 20 | 307 |  | 13.5 |
|  |  |  | 24 | 20 | 0 |  | 12.6 |
| IV | SOCl$_2$ | 25 | 0 |  | 1456 | 18 | 16.2 |
|  |  |  | 21 | 0 | 79 |  | 15.1 |
| V | CH$_3$SO$_2$Cl | 287 | 0 |  | 1116 |  | 14.8 |
|  |  |  | 6 | 0 | 849 |  | 15.2 |
|  |  |  | 23 | 0 | 684 |  | 14.7 |
|  |  |  | 30 | 0 | 493 |  | 15.6 |
|  |  |  | 70 | 0 | 150 |  | 14.1 |
| VI | CH$_3$SO$_2$Cl | 287 | 5.5 | 23 | 642 |  | 13.5 |
|  |  |  | 23 | 23 | 116 |  | 13.8 |
|  |  |  | 30 | 23 | 0 |  | 13.4 |

We claim:

1. A process for removing water from wet isocyanic acid which comprises forming a solution of isocyanic acid containing water in an organic solvent therefor, and adding to said solution a drying agent selected from the group consisting of hydrogen halides and compounds which form a hydrogen halide in said solution, said drying agent being added in an amount sufficient to provide said hydrogen halide in molar excess of the water present.

2. A process according to claim 1 in which said isocyanic acid further contains ammonia and in which drying agent is added in amount also sufficient to provide said hydrogen halide in molar excess of said ammonia.

3. A process according to claim 2 in which said solution containing said drying agent is maintained at room temperature for a sufficient period of time to reduce said water content of said isocyanic acid substantially to zero.

4. A process according to claim 2 in which said drying agent is hydrogen chloride.

5. A process according to claim 2 in which said drying agent is thionyl chloride.

6. A process according to claim 2 in which said drying agent is methane sulfonyl chloride.

7. A process according to claim 2 in which the solvent is toluene.

8. A process according to claim 1 in which said solution containing said drying agent is maintained at room temperature for a sufficient period of time to reduce said water content of said isocyanic acid substantially to zero.

9. A process according to claim 1 in which said drying agent is hydrogen chloride.

10. A process according to claim 1 in which said drying agent is thionyl chloride.

11. A process according to claim 1 in which said drying agent is methane sulfonyl chloride.

12. A process according to claim 1 in which the solvent is toluene.

* * * * *